United States Patent
Alshehri et al.

(10) Patent No.: US 10,612,362 B2
(45) Date of Patent: Apr. 7, 2020

(54) COILED TUBING MULTIFUNCTIONAL QUAD-AXIAL VISUAL MONITORING AND RECORDING

(71) Applicant: Saudi Arabian Oil Company, Dhahran (SA)

(72) Inventors: Mohammed A. Alshehri, Dhahran (SA); Ossama R. Sehsah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/983,611

(22) Filed: May 18, 2018

(65) Prior Publication Data

US 2019/0353025 A1 Nov. 21, 2019

(51) Int. Cl.
*E21B 47/00* (2012.01)
*E21B 19/22* (2006.01)
(Continued)

(52) U.S. Cl.
CPC .......... *E21B 47/0006* (2013.01); *E21B 19/22* (2013.01); *E21B 47/0002* (2013.01);
(Continued)

(58) Field of Classification Search
None
See application file for complete search history.

(56) References Cited

U.S. PATENT DOCUMENTS

| | | |
|---|---|---|
| 1,812,044 A | 6/1931 | Grant |
| 3,335,801 A | 8/1967 | Wilsey |

(Continued)

FOREIGN PATENT DOCUMENTS

| | | |
|---|---|---|
| CN | 204177988 | 2/2015 |
| EP | 377234 | 10/1989 |

(Continued)

OTHER PUBLICATIONS

Offshore, "Completions Technology: Large monobore completions prevent high-volume gas well flow restrictions", Dec. 1, 2001, retrieved from the internet: • http://www.offshore-mag.com/articles/print/volume-61/issue-12/news/completions-technology-large-monobore-completions-prevent-high-volume-gas-well-flow-restrictions.html, 9 pages.

(Continued)

*Primary Examiner* — Mohammed Jebari
(74) *Attorney, Agent, or Firm* — Fish & Richardson P.C.

(57) ABSTRACT

A programmable logic controller (PLC) receives first information from a first set of cameras positioned adjacent to a coiled tubing reel configured to deliver a coiled tubing string for insertion into a well. The PLC receives second information from a second different set of cameras positioned on a center of an arc of a primary turn of coiled tubing string. The PLC receives third information from a third different set of cameras positioned above a stripper and below an injector head. The PLC receives fourth information from a fourth different set of cameras embedded in an adapted spool below coiled tubing blow-out preventer equipment. The PLC uses the first, second, third, and fourth information, each including images of the coiled tubing string captured over time, to determine flaws exists in a segment of the coiled tubing string. A notification is provided that includes information identifying the flaws.

17 Claims, 6 Drawing Sheets

(51) Int. Cl.

| | |
|---|---|
| *H04N 5/225* | (2006.01) |
| *H04N 5/247* | (2006.01) |
| *G06T 7/00* | (2017.01) |
| *E21B 19/08* | (2006.01) |
| *E21B 33/06* | (2006.01) |
| *E21B 19/00* | (2006.01) |
| *E21B 19/24* | (2006.01) |

(52) U.S. Cl.
CPC ......... *G06T 7/0004* (2013.01); *H04N 5/2253* (2013.01); *H04N 5/247* (2013.01); *E21B 19/008* (2013.01); *E21B 19/08* (2013.01); *E21B 19/24* (2013.01); *E21B 33/06* (2013.01); *G06T 2207/30172* (2013.01); *H04N 2005/2255* (2013.01)

(56) References Cited

U.S. PATENT DOCUMENTS

| | | |
|---|---|---|
| 3,557,875 A | 1/1971 | Solum et al. |
| 4,058,163 A | 11/1977 | Yandell |
| 4,384,625 A | 5/1983 | Roper et al. |
| 4,399,873 A | 8/1983 | Lindsey, Jr. |
| 4,458,761 A | 7/1984 | Van Vreeswyk |
| 4,482,014 A | 11/1984 | Allwin et al. |
| 4,646,842 A | 3/1987 | Arnold et al. |
| 4,674,569 A | 6/1987 | Revils et al. |
| 4,681,159 A | 7/1987 | Allwin et al. |
| 4,693,328 A | 9/1987 | Furse et al. |
| 4,852,654 A | 8/1989 | Buckner |
| 4,855,820 A | 8/1989 | Barbour |
| 4,944,348 A | 7/1990 | Whiteley et al. |
| 4,993,493 A | 2/1991 | Arnold |
| 5,152,342 A | 10/1992 | Rankin et al. |
| 5,390,742 A | 2/1995 | Dines et al. |
| 5,947,213 A | 9/1999 | Angle |
| 6,009,948 A | 1/2000 | Flanders et al. |
| RE36,556 E | 2/2000 | Smith |
| 6,152,221 A | 11/2000 | Carmicheal et al. |
| 6,163,257 A | 12/2000 | Tracy |
| 6,234,250 B1 | 5/2001 | Green et al. |
| 6,321,596 B1 * | 11/2001 | Newman ................ E21B 19/22 73/152.45 |
| 6,378,628 B1 | 4/2002 | McGuire et al. |
| 6,527,066 B1 | 3/2003 | Rives |
| 6,550,534 B2 | 4/2003 | Brett |
| 6,577,244 B1 | 6/2003 | Clark et al. |
| 6,662,110 B1 | 12/2003 | Bargach et al. |
| 6,684,953 B2 | 2/2004 | Sonnier |
| 6,691,779 B1 | 2/2004 | Sezginer et al. |
| 6,739,398 B1 | 5/2004 | Yokley et al. |
| 6,752,216 B2 | 6/2004 | Coon |
| 6,873,267 B1 | 3/2005 | Tubel et al. |
| 6,899,178 B2 | 5/2005 | Tubel |
| 6,938,698 B2 | 9/2005 | Coronado |
| 7,219,730 B2 | 5/2007 | Tilton et al. |
| 7,228,902 B2 | 6/2007 | Oppelt |
| 7,243,735 B2 | 7/2007 | Koederitz et al. |
| 7,252,152 B2 | 8/2007 | LoGiudice et al. |
| 7,278,492 B2 | 10/2007 | Braddick |
| 7,419,001 B2 | 9/2008 | Broussard |
| 7,581,440 B2 | 9/2009 | Meek |
| 7,654,334 B2 | 2/2010 | Manson |
| 7,665,537 B2 | 2/2010 | Patel et al. |
| 7,677,303 B2 | 3/2010 | Coronado |
| 7,938,192 B2 | 5/2011 | Rytlewski |
| 7,940,302 B2 | 5/2011 | Mehrotra et al. |
| 8,028,767 B2 | 10/2011 | Radford et al. |
| 8,102,238 B2 | 1/2012 | Golander et al. |
| 8,191,635 B2 | 6/2012 | Buske et al. |
| 8,237,585 B2 | 8/2012 | Zimmerman |
| 8,334,775 B2 | 12/2012 | Tapp et al. |
| 8,424,605 B1 | 4/2013 | Schultz et al. |
| 8,448,724 B2 | 5/2013 | Buske et al. |
| 8,469,084 B2 | 6/2013 | Clark et al. |
| 8,528,668 B2 | 9/2013 | Rasheed |
| 8,540,035 B2 | 9/2013 | Xu et al. |
| 8,750,513 B2 | 6/2014 | Renkis |
| 8,789,585 B2 | 7/2014 | Leising et al. |
| 8,800,655 B1 | 8/2014 | Bailey |
| 8,833,472 B2 | 9/2014 | Hay |
| 8,919,431 B2 | 12/2014 | Lott |
| 8,925,213 B2 | 1/2015 | Sallwasser |
| 8,991,489 B2 | 3/2015 | Redlinger et al. |
| 9,051,792 B2 | 6/2015 | Herberg et al. |
| 9,091,148 B2 | 7/2015 | Moffitt et al. |
| 9,121,255 B2 | 9/2015 | Themig et al. |
| 9,140,100 B2 | 9/2015 | Daccord et al. |
| 9,157,294 B2 | 10/2015 | Kleppa et al. |
| 9,187,959 B2 | 11/2015 | Treviranus et al. |
| 9,208,676 B2 | 12/2015 | Fadell et al. |
| 9,341,027 B2 | 5/2016 | Radford et al. |
| 9,494,003 B1 | 11/2016 | Carr |
| 9,506,318 B1 | 11/2016 | Brunet |
| 9,546,536 B2 | 1/2017 | Schultz et al. |
| 2002/0148607 A1 | 10/2002 | Pabst |
| 2003/0001753 A1 | 1/2003 | Cernocky et al. |
| 2003/0118230 A1 * | 6/2003 | Song ..................... E21B 19/22 382/152 |
| 2004/0060741 A1 | 4/2004 | Shipalesky et al. |
| 2004/0156264 A1 | 8/2004 | Gardner et al. |
| 2005/0273302 A1 | 12/2005 | Huang et al. |
| 2006/0081375 A1 | 4/2006 | Ruttley |
| 2006/0086497 A1 | 4/2006 | Ohmer et al. |
| 2006/0107061 A1 | 5/2006 | Holovacs |
| 2006/0260799 A1 | 11/2006 | Broussard |
| 2006/0290528 A1 | 12/2006 | MacPherson et al. |
| 2007/0057811 A1 | 3/2007 | Mehta |
| 2007/0107911 A1 | 5/2007 | Miller et al. |
| 2007/0187112 A1 | 8/2007 | Eddison et al. |
| 2007/0261855 A1 | 11/2007 | Brunet |
| 2008/0041631 A1 | 2/2008 | Vail, III |
| 2008/0115574 A1 | 5/2008 | Meek |
| 2009/0045974 A1 | 2/2009 | Patel |
| 2009/0050333 A1 | 2/2009 | Smith |
| 2009/0114448 A1 | 5/2009 | Laird et al. |
| 2009/0192731 A1 | 7/2009 | De Jesus et al. |
| 2009/0223670 A1 | 9/2009 | Snider |
| 2009/0289808 A1 | 11/2009 | Prammer |
| 2010/0097205 A1 | 4/2010 | Script |
| 2010/0097450 A1 * | 4/2010 | Pugh ..................... E21B 47/04 348/61 |
| 2010/0101786 A1 | 4/2010 | Lovell et al. |
| 2010/0212891 A1 | 8/2010 | Stewart et al. |
| 2010/0212900 A1 | 8/2010 | Eddison et al. |
| 2010/0212901 A1 | 8/2010 | Buytaert |
| 2010/0258298 A1 | 10/2010 | Lynde et al. |
| 2010/0282511 A1 | 11/2010 | Maranuk et al. |
| 2011/0067884 A1 | 3/2011 | Burleson et al. |
| 2011/0073329 A1 | 3/2011 | Clemens et al. |
| 2011/0127044 A1 | 6/2011 | Radford et al. |
| 2011/0147014 A1 | 6/2011 | Chen et al. |
| 2011/0240302 A1 | 10/2011 | Coludrovich, III |
| 2011/0266004 A1 | 11/2011 | Hallundbaek et al. |
| 2012/0085531 A1 | 4/2012 | Leising et al. |
| 2012/0085540 A1 | 4/2012 | Heijnen |
| 2012/0175135 A1 | 7/2012 | Dyer et al. |
| 2012/0241154 A1 | 9/2012 | Zhou |
| 2012/0247767 A1 | 10/2012 | Themig et al. |
| 2012/0307051 A1 | 12/2012 | Welter |
| 2012/0312560 A1 | 12/2012 | Bahr et al. |
| 2013/0128697 A1 | 5/2013 | Contant |
| 2013/0153245 A1 | 6/2013 | Knobloch et al. |
| 2013/0284434 A1 * | 10/2013 | Marvel ................ E21B 47/04 166/255.1 |
| 2014/0060844 A1 | 3/2014 | Barbour et al. |
| 2014/0083769 A1 | 3/2014 | Moriarty et al. |
| 2014/0090898 A1 | 4/2014 | Moriarty et al. |
| 2014/0126330 A1 | 5/2014 | Shampine et al. |
| 2014/0139681 A1 | 5/2014 | Jones, Jr. et al. |
| 2014/0166367 A1 | 6/2014 | Campbell et al. |
| 2014/0172306 A1 | 6/2014 | Brannigan |
| 2014/0208847 A1 | 7/2014 | Baranov |

(56) References Cited

U.S. PATENT DOCUMENTS

| | | |
|---|---|---|
| 2014/0308203 A1 | 10/2014 | Sheinberg et al. |
| 2015/0027706 A1 | 1/2015 | Symms |
| 2015/0090459 A1 | 4/2015 | Cain et al. |
| 2015/0152713 A1 | 6/2015 | Garcia et al. |
| 2015/0176362 A1 | 6/2015 | Prieto et al. |
| 2015/0267500 A1 | 9/2015 | Van Dongen et al. |
| 2015/0308203 A1 | 10/2015 | Lewis |
| 2016/0160578 A1 | 6/2016 | Lee |
| 2016/0215612 A1 | 7/2016 | Morrow |
| 2016/0230508 A1 | 8/2016 | Jensen |
| 2016/0237764 A1 | 8/2016 | Jellison et al. |
| 2016/0237768 A1 | 8/2016 | Jamison et al. |
| 2016/0312565 A1* | 10/2016 | Papadimitriou ...... E21B 33/064 |
| 2016/0356152 A1 | 12/2016 | Croux |
| 2017/0074071 A1 | 3/2017 | Tzallas et al. |
| 2018/0030810 A1 | 2/2018 | Saldanha |

FOREIGN PATENT DOCUMENTS

| | | |
|---|---|---|
| EP | 618345 | 10/1994 |
| EP | 2692982 | 5/2014 |
| EP | 2835493 | 2/2015 |
| GB | 2157743 | 10/1985 |
| GB | 2261238 | 12/1993 |
| GB | 2460096 | 11/2009 |
| GB | 2470762 | 12/2010 |
| WO | 2003058545 | 7/2003 |
| WO | 2011038170 | 3/2011 |
| WO | 2011095600 | 8/2011 |
| WO | 2011159890 | 12/2011 |

OTHER PUBLICATIONS

Engineers Edge—ACME Stub Threads Size Designation Table Chart, retrieved from the internet at: http://www.engineersedge.com/hardware/acme-stub-thread.htm, retrieved Feb. 27, 2017, 2 pages.

Engineering Innovation Worldwide, TIW XPAK Liner Hanger System brochure, 2015 TIW Corporation, Houston TX, TIW0001D Jun. 2015, retrieved form the internet at: http://www.tiwoiltools.com/Images/Interior/downloads/tiw_xpak_brochure.pdf, 4 pages.

Mi Swaco: A Schlumberger Company, "Intelligent Fluids Monitoring System," available on or before Mar. 11, 2015, [retrieved May 1, 2018] retrieved from URL: <https://www.slb.com/resources/other_resources/brochures/miswaco/intelligent_fluids_monitoring_brochure.aspx>, 8 pages.

PCT International Search Report and Written Opinion in International Appln. No. PCT/US2019/031425, dated Aug. 21, 2019, 13 pages.

* cited by examiner

COILED TUBING MULTIFUNCTIONAL QUAD-AXIAL VISUAL MONITORING AND RECORDING

BACKGROUND

The present disclosure applies to drilling and workover during coiled tubing operations for both oil and gas sectors. Monitoring coiled tubing during operation can be an essential part of ensuring successful operations. Coiled tubing string alloy can be delicate compared to other conditional drilling, and workover tools and can require continuous monitoring and evaluation of the string before failure. Coiled tubing can have various types of failures and failure points, including where the tubing is engaged near the spool for deployment into a hole and points at which the coiled tubing encounters turns or bends or may otherwise be stressed. Stresses to tubing can be physical or chemical. Conventional systems may have single camera systems and non-integrated systems for monitoring coiled tubing operations.

SUMMARY

The present disclosure describes techniques that can be used for coiled tubing visual monitoring and recording. For example, the techniques can be used in drilling and workover during coiled tubing operations for both oil and gas sectors.

In some implementations, a computer-implemented method, includes: receiving, by a PLC from a first set of cameras that are positioned adjacent to a coiled tubing reel configured to deliver a coiled tubing string for insertion into a well, first information including images of the coiled tubing string captured over time during the insertion; receiving, by the PLC from a second different set of cameras that are positioned on a center of an arc of a primary turn imposed on the coiled tubing string, second information including images of the coiled tubing string captured over time during the insertion; receiving, by the PLC from a third different set of cameras that are positioned above a stripper and below an injector head, third information including images of the coiled tubing string captured over time during the insertion; receiving, by the PLC from a fourth different set of cameras that are embedded in an adapted spool below coiled tubing blow-out preventer equipment, fourth information including images of the coiled tubing string captured over time during the insertion; determining, by the PLC and using the first information, the second information, the third information, and the fourth information, that at least one flaw exists in a segment of the coiled tubing string; and providing a notification that includes information identifying the at least one flaw.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, automatic alerts and recommendations can be pushed to an end user. Second, visual records, including video and pictures, can be collected, stored, and analyzed. Third, computer-based processes can be used not only to record but to interpret the visual records. Fourth, captured data, videos, pictures, recommendations, and alerts can be available online for all end users. Fifth, human interference in production can be minimized.

The details of one or more implementations of the subject matter of this specification are set forth in the Detailed Description, the claims, and the accompanying drawings. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
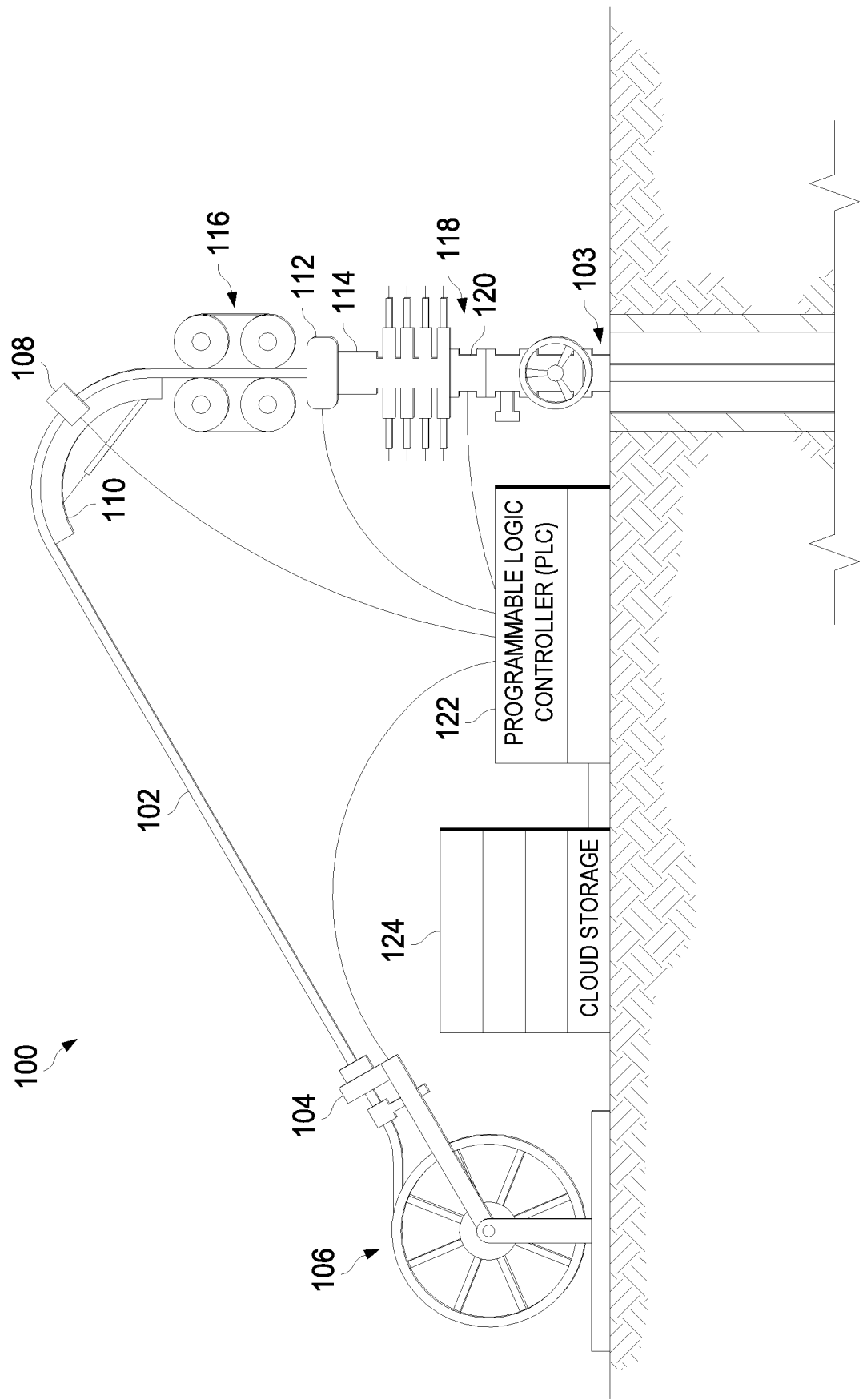
FIG. 1 is a schematic diagram illustrating an example of a monitoring system, according to some implementations of the present disclosure.

The following detailed description describes techniques for coiled tubing visual monitoring and recording. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In some implementations, a system for coiled tubing visual monitoring and recording can include four monitoring points, a programmable logic controller (PLC) unit, and storage. The system can use cameras (for example, video cameras) to monitor and record information that is used to predict failures in the coiled tubing before the failures occur.

The system can provide recommendations based on recorded videos and extracted photos. Records can be saved for further diagnoses.

The coiled tubing string can be monitored in four different zones on the surface of a drilling operation. Each zone can include a set of cameras (for example, video recorders) that are mounted around or adjacent to the expected damaging tool. A final set of cameras can be located above the wellhead to check for damage from the well or from surface equipment. The well can be an oil well, a gas well, or another type of well in which a coiled tubing string is used. The system can automatically record, diagnose, and push notification messages to a user (for example, a Coiled Tubing Engineer). The notifications can include information that identifies the orientation, depth, and time (for example, using a timestamp that can be correlated to a position on the string) that the damage occurs to the string. The string data can be stored for future retrieval. The monitoring system can be configured to switch on automatically during every coil tubing trip.

Techniques described in the present disclosure can provide improvements over conventional systems in the following ways. Visual photos and text alerts can be provided that are suitable for specialized and non-specialized end users. This can reduce discrepancies in the interpretation of the provided information. Each camera can be focused on less arc of the coiled tubing outer diameter for higher quality photos than are available in conventional systems. The use of multiple positions for the placement of cameras can facilitate better diagnoses of problems, such as to pinpoint and assign the main reason for a given problem to the wellbore, arc, stripper, or blowout preventer (BOP).

The system can include the following features. The system can be used to predict and analyze pitting and colors. Extensive training is not required to use the system. Human interference in operations can be minimized. In addition to recording, the system can also serve as an interrupter when a problem is detected that is related to pitting, color changing, and a root cause of the damage. Information can be accumulated and stored, including using storage in the Cloud, to provide immediate access to the data, including alerts and recommendations. Data access can include local access, for example, by drilling operation personnel using computer devices communicatively coupled to the system. Data access can also include access by mobile devices using applications (apps), messaging, emails, and the like. Data access can also include web access by authorized users. Information can be encrypted.

Problems that are solved by the system can include the following. Human errors can be eliminated. The coiled tubing string can be monitored in 360° including all sides of the string. The root cause of the problem can be identified to prevent the problem from happening again to new coiled tubing strings. Failures of the string during operations on both oil and gas wells, and lengthy and costly fishing operations, can be avoided. A database record of the string conditions can be provided.

The system can monitor coiled tubing string external diameter conditions during several types of coiled tubing operations, including coiled tubing underbalanced drilling, acid stimulation jobs, nitrogen lift, running shifting tools, performing production logging tool (PLT) operations, or any other coiled tubing related operations. The system can be, for example, a coiled tubing multifunctional quad-axial visual monitoring and recording system and can provide the following functions: 1) monitoring the depreciation of the coiled tubing string compared with its original conditions, 2) evaluating coiled tubing string conditions continuously, 3) avoiding failure of the string inside oil and gas wells, 4) sending warning and recommendations of wear and brittleness signs, 5) historically monitoring the coiled tubing metal conditions, and 6) preventing lengthy and costly fishing operations.

Monitoring processes can be performed in multiple (for example, four) zones across the coiled tubing path at the surface. Visual and numeric monitoring can use several (for example, thirteen) cameras and at least one depth meter that are distributed in multiple (for example, four) key positions. The monitoring can be used to collect information that is recorded and processed by the PLC. The information can be used to identify, detect, or infer pitting, color changes, external damage to the string steel, and other conditions that can then be used to predict the effects on the alloy by gases and other causes. Recommendations and alerts can be automatically provided to end users, showing tube conditions before failures occur.

Cloud storage used by the monitoring system can serve all data, PLC processing information, recommendations, and alerts. Alerts and recommendations can be immediately pushed to end users' email or cell phones. The rest of the information can be stored in the cloud storage system for future retrieval or further processing as needed. Cloud storage can make the information accessible pertinent and authorized parties in real time. The system can be run automatically without human intervention to eliminate the human error and enhance the visual results and accuracy. In some implementations, the system can include four monitoring devices, described with reference to FIGS. 1-5.

FIG. 1 is a schematic diagram illustrating an example of a monitoring system 100, according to some implementations of the present disclosure. The monitoring system 100 can be used to monitor a coiled tubing string 102 that is used, for example, in drilling and workover during coiled tubing operations for both oil and gas sectors, such as to deploy the coiled tubing string 102 into a well hole 103.

In some implementations, monitoring system 100 includes four monitoring devices, each including one or more cameras (for example, video cameras). A first monitoring device 104, for example, including four cameras, can be positioned closest (among the monitoring devices) to a coiled tubing reel 106. A second monitoring device 108 can be located on (or near) the center of an arc (or "goose neck") 110. A third monitoring device 112 can be mounted above a stripper 114 and below an injector head 116 that grips the coiled tubing string 102 for running the coiled tubing string 102 into the wellbore. The third monitoring device 112 can include four cameras and four light sources. A fourth monitoring device 118 can include a set of cameras that are embedded in an adapted spool 120 below coiled tubing blow-out preventer equipment (BOPE).

The monitoring system 100 includes a programmable logic controller (PLC) 122 that includes a power source. The PLC 122 can store and access data in cloud storage 124. The PLC 122 can provide power to the monitoring devices 104, 108, 112, and 118. The PLC 122 can process the data based on built in logic functions according to FIG. 6

Figure 2:
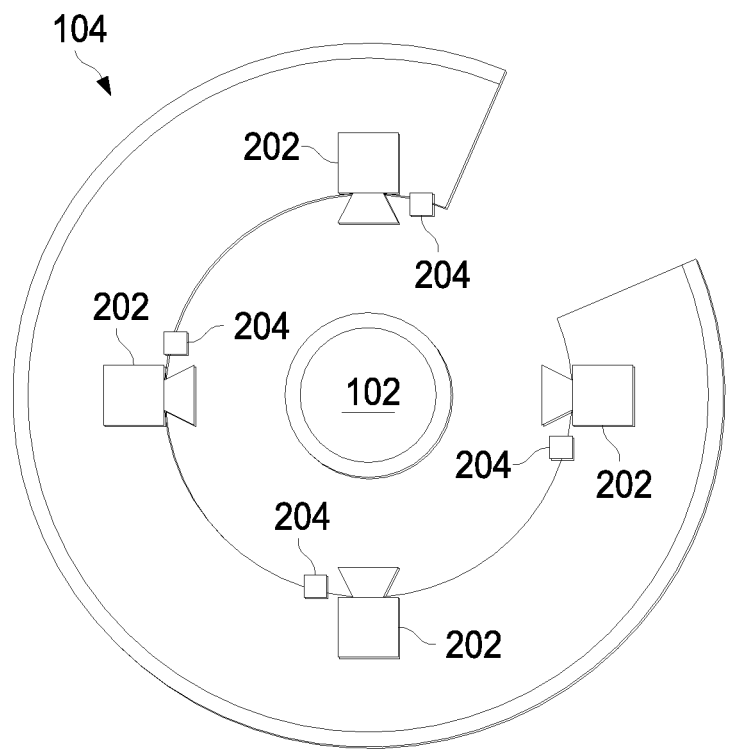
FIGS. 2 and 3 are cross sectional views illustrating an example of the first monitoring device, according to some implementations of the present disclosure.
Figure 3:
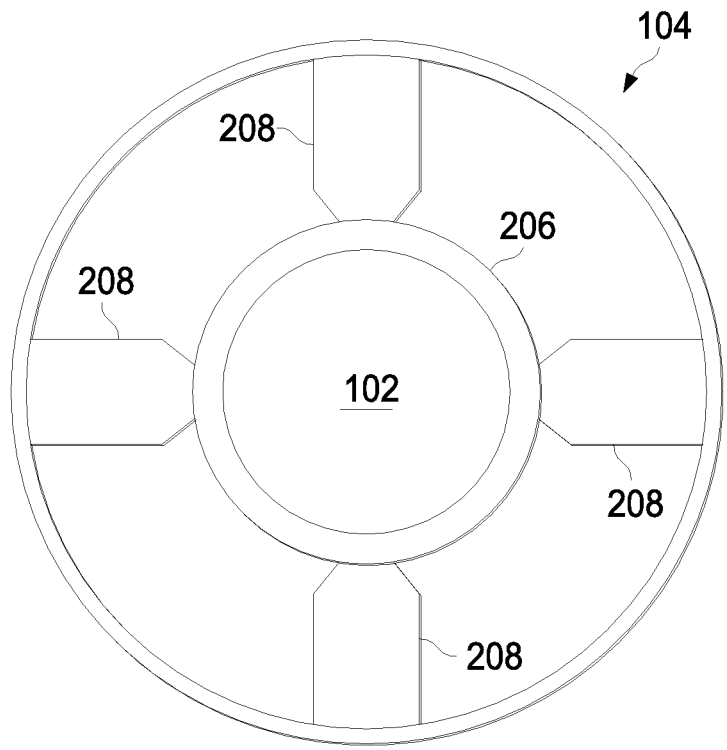

FIGS. 2 and 3 are cross sectional views illustrating an example of the first monitoring device 104, according to some implementations of the present disclosure. FIG. 2 shows example locations of the cameras in the first monitoring device 104. FIG. 3 The first monitoring device 104 can include four cameras 202, four light sources 204, a tube wiper 206, and four wheels 208 that serve as centralizers to centralize the coiled tubing string 102. The first monitoring device 104 can also include at least one depth meter (for example, a component of the tub wiper 206) to measure the depth of the coiled tubing string 102.

The second monitoring device 108 can include a single camera and light source to scan the upper 180° of the coiled tubing string 102. The single camera can read the coiled tubing string 102 where the string is subjected the maximum bending forces. Cracks that occur in the coiled tubing string 102 can have maximum sizes in this location.

Figure 4:
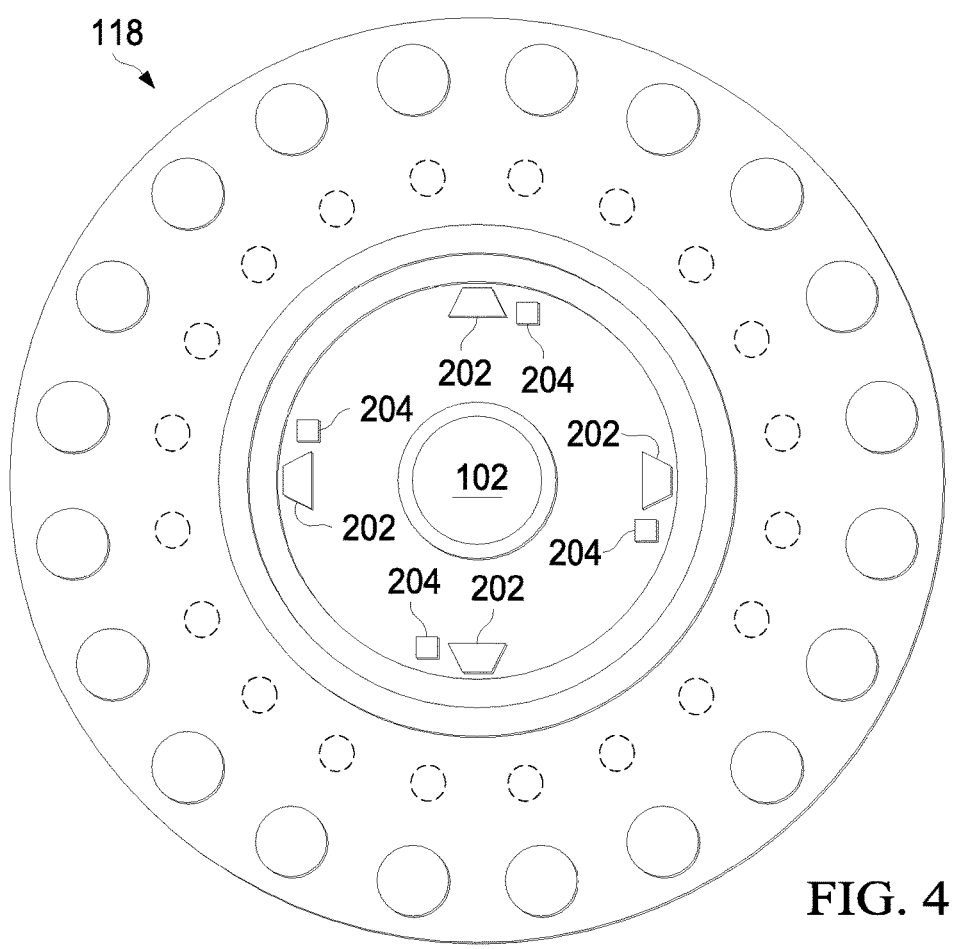
FIG. 4 is a cross sectional view illustrating an example of the fourth monitoring device 118, according to some implementations of the present disclosure.

FIG. 4 is a cross sectional view illustrating an example of the fourth monitoring device 118, according to some implementations of the present disclosure. The fourth monitoring device 118 can include four cameras 202 that are embedded in an adapted spool below coiled tubing BOPE. The PLC can receive, from the fourth different set of cameras, fourth information captured by the fourth different set of cameras. For example, the fourth information can include images of the coiled tubing string captured over time during the insertion of the coiled tubing string 102 into the well.

Figure 5:
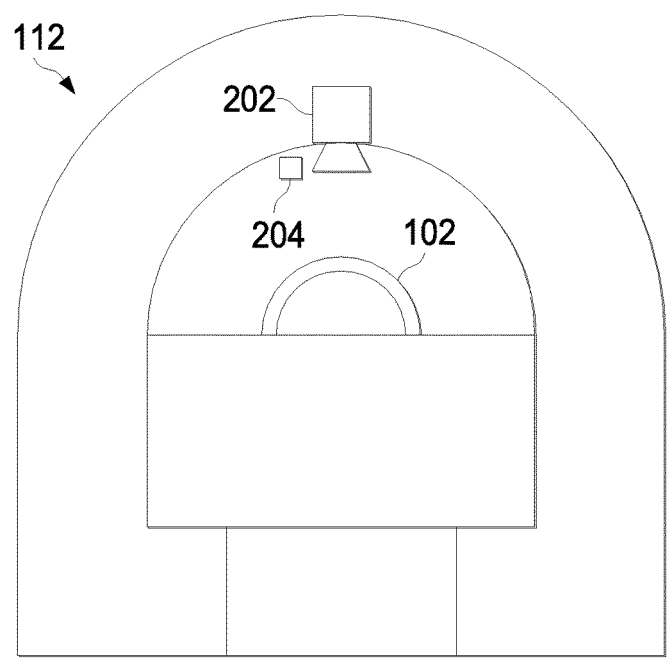
FIG. 5 is a schematic diagram illustrating an example of the third monitoring device, according to some implementations of the present disclosure.

FIG. 5 is a schematic diagram illustrating an example of the third monitoring device 112, according to some implementations of the present disclosure. The third monitoring device 112 can measure, for example, a maximum bending force of the coiled tubing string 102.

Figure 6:
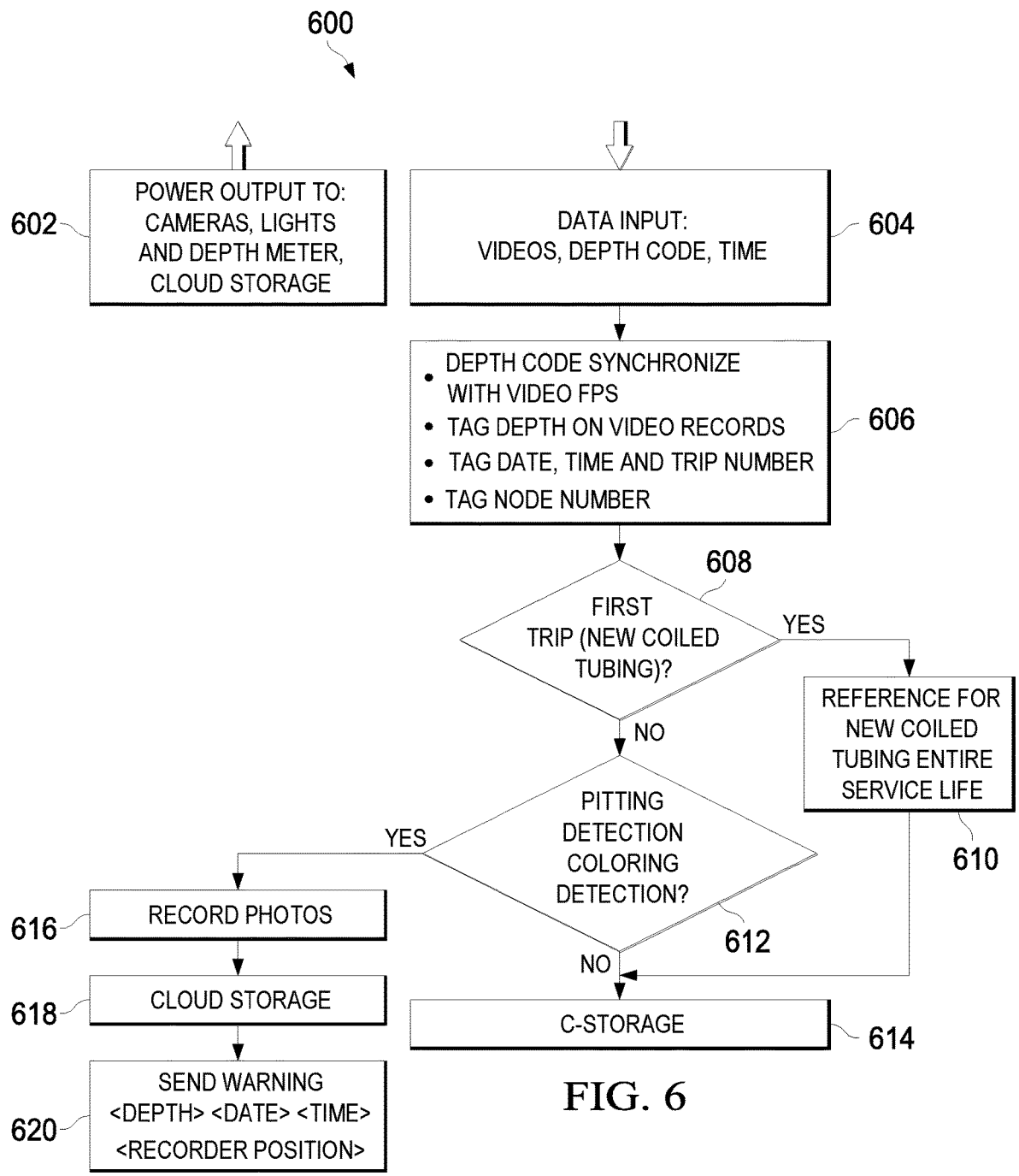
FIG. 6 is block diagram illustrating an example of power and logic flow of the PLC, according to some implementations of the present disclosure.

FIG. 6 is block diagram illustrating an example of power and logic flow 600 of the PLC 122, according to some implementations of the present disclosure. Steps of the power and logic flow 600 can occur in any feasible order, and some steps can occur simultaneously. However, the steps of power and logic flow 600 can generally occur in numerical order, except when decisions are made, for example, at 608 and 612.

At 602, power is provided to the monitoring devices 104, 108, 112, and 118, at least one depth meter, and the light sources 204. Power can also be provided to components that interface with the cloud storage 124.

At 604, information is received from the monitoring devices 104, 108, 112, and 118 and any other devices for monitoring the coiled tubing string 102. The information can include, at 606 for example, videos, depth codes, and date/time information. Depth codes can be used, for example, to correlate received video with positions on (or portions of) the coiled tubing string 102, such as using a system that is based on frame per second (FPS). The information can be used to annotate (or tag) depths on the video records, date/times and trip information (for example, trip numbers), and node number.

At 608, a determination is made whether the current trip is a first trip (for example, a trip using new coiled tubing). At 610, if the determination indicates that the current trip is a first trip, then a reference is determined for the entire service life of the coiled tubing string 102. Otherwise, at 612, if the determination indicates that the current trip is not a first trip, then analysis is performed on the received information, including at least pitting detection analysis and coloring detection analysis. At 614, information obtained in steps 610 and 612 is stored in the cloud storage 124.

At 616, if pitting or coloring is detected at 612, then photos are recorded. At 618, the recorded photos are stored in the cloud storage 124.

At 620, based on information that pitting or coloring has been detected, warnings are sent. The warnings can include information such as depth information, a date and time, and a position on the particular one of the monitoring devices 104, 108, 112, and 118 that was used to detect the problem (and potential failure). Warnings can be sent, for example, as notifications sent as text messages, email messages, on-screen warnings, or in other ways.

In some implementations, certain warnings (and information on which the warnings are based) can cause the automatic triggering of events (in addition to the warnings). For example, if a hole and serious crack is detected in the coiled tubing string 102, or if some threshold is determined (for example, size of a crack or a substantial coloration) then pre-determined equipment on the system 100 can be shut down, or a warning can be sent to the equipment.

Figure 7:
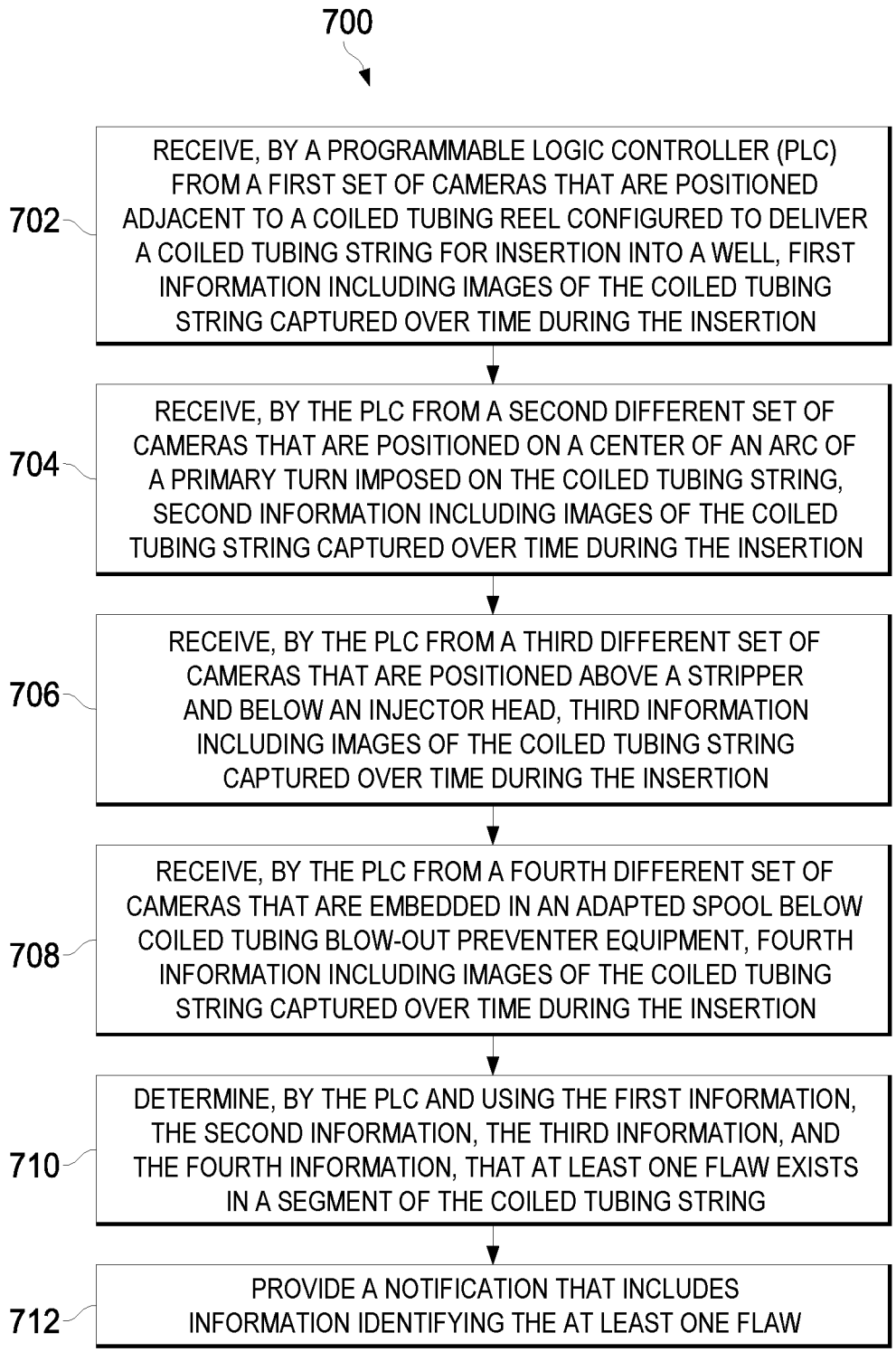
FIG. 7 is a flowchart of an example method for monitoring a coiled tubing string, according to some implementations of the present disclosure.

FIG. 7 is a flowchart of an example method 700 for monitoring a coiled tubing string, according to some implementations of the present disclosure. For clarity of presentation, the description that follows generally describes method 700 in the context of the other figures in this description. However, it will be understood that method 700 may be performed, for example, by any suitable system, environment, software, and hardware, or a combination of systems, environments, software, and hardware, as appropriate. In some implementations, various steps of method 700 can be run in parallel, in combination, in loops, or in any order.

At 702, first information captured by the first set of cameras is received by a programmable logic controller (PLC) from a first set of cameras that are positioned adjacent to a coiled tubing reel configured to deliver a coiled tubing string for insertion into a well. The first information includes images of the coiled tubing string captured over time during the insertion. For example, the PLC 122 can receive images and/or video from the cameras 202 in the first monitoring device 104. The images and/or video can be obtained while the coiled tubing string 102 is being deployed into the well hole 103. From 702, method 700 proceeds to 704.

At 704, second information captured by the second different set of cameras is received by the PLC from a second different set of cameras that are positioned on a center of an arc of a primary turn imposed on the coiled tubing string. The second information including images of the coiled tubing string captured over time during the insertion. As an example, the PLC 122 can receive images and/or video from the second monitoring device 108 that is located on (or near) the center of the arc (or "goose neck") 110. At the location of the arc 110, the coiled tubing string 102 can experience a significant turn, which can amplify flaws such as cracks that can appear in an upper/outer edge of the coiled tubing string 102 where the coiled tubing string 102 turns at the arc 110. From 704, method 700 proceeds to 706.

At 706, third information captured by the third different set of cameras is received by the PLC from a third different set of cameras that are positioned above a stripper and below an injector head. The third information including images of the coiled tubing string captured over time during the insertion. For example, the PLC 122 can receive images and/or video from the third monitoring device 112 that is mounted above the stripper 114 and below the injector head 116. At this location, the coiled tubing string 102 is gripped for running the coiled tubing string 102 into the wellbore (for example, the well hole 103). The third monitoring device 112 can include four cameras and four light sources. From 706, method 700 proceeds to 708.

At 708, fourth information captured by the fourth different set of cameras is received by the PLC from a fourth different set of cameras that are embedded in an adapted spool below coiled tubing blow-out preventer equipment. The fourth information including images of the coiled tubing string captured over time during the insertion. As an example, the PLC 122 can receive images and/or video from cameras in the fourth monitoring device 118 that are embedded in the adapted spool 120 below coiled tubing blow-out preventer equipment (BOPE). From 708, method 700 proceeds to 710.

At 710, a determination is made by the PLC that at least one flaw exists in a segment of the coiled tubing string. The determination is made using the first information, the second information, the third information, and the fourth information. For example, the PLC 122 can perform analysis of the received information that follows the power and logic flow 600 of the PLC 122. From 710, method 700 proceeds to 712.

At 712, a notification is provided that includes information identifying the at least one flaw. As an example, if pitting, discoloration, or other issues are detected in portions of the coiled tubing string 102 at 612 in the power and logic flow 600, corresponding photos can be recorded at 616, cloud storage 124 can be updated at 618, and a warning can be sent at 620. The notification that is provided can be in the form or one or more of a text message, a phone call, a notification displayed in an application, and a notification displayed on a web page. After 712, method 700 stops.

In some implementations, method 700 further includes determining that a numerical measure of the flaw in the segment of the coiled tubing string exceeds a pre-determined threshold and stopping the insertion of the coiled tubing string into the well based on the determination. For example, if the PLC 122 determines that pitting or discoloration exceeds a threshold, then the PLC 122 can send an instruction to equipment that is deploying the coiled tubing string 102 that operations are to be shut down.

Figure 8:
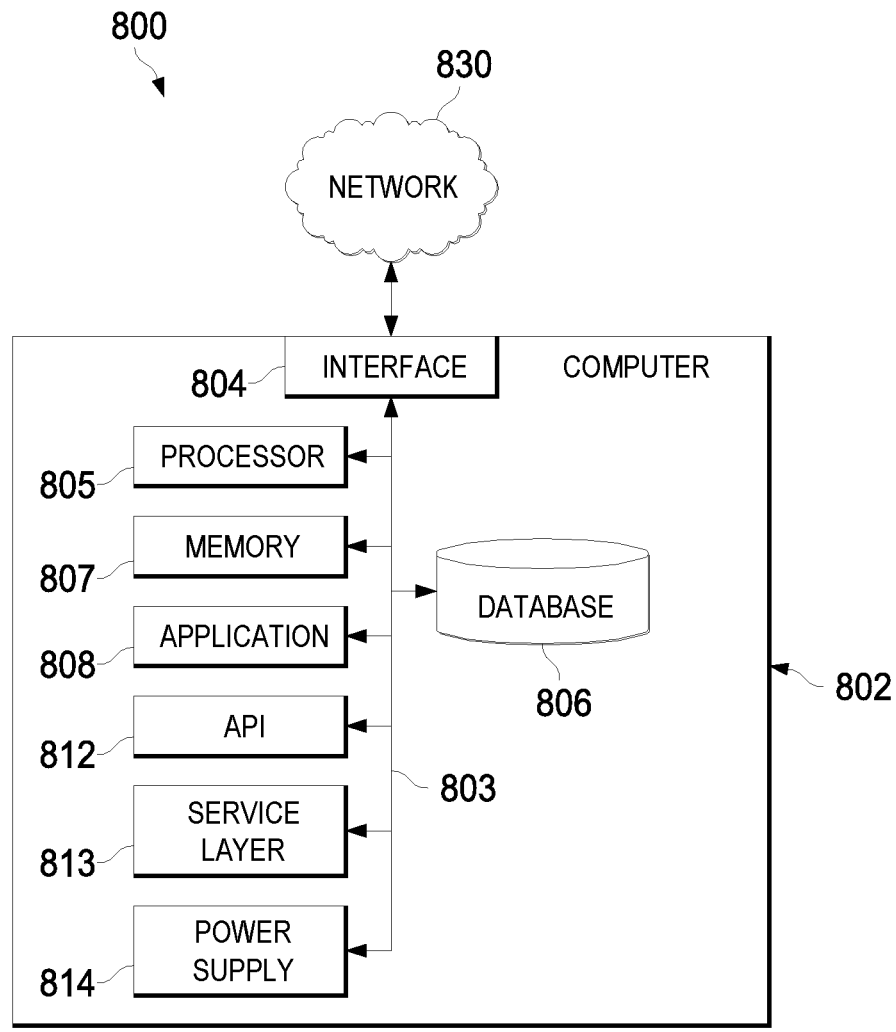
FIG. 8 is a block diagram illustrating an example computer system used to provide computational functionalities associated with described algorithms, methods, functions, processes, flows, and procedures as described in the instant disclosure, according to some implementations of the present disclosure.

FIG. 8 is a block diagram of an example computer system 800 used to provide computational functionalities associated with described algorithms, methods, functions, processes, flows, and procedures, as described in the instant disclosure, according to some implementations of the present disclosure. The illustrated computer 802 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 802 may comprise a computer that includes an input device, such as a keypad, keyboard, touch screen, or other device that can accept user information, and an output device that conveys information associated with the operation of the computer 802, including digital data, visual, or audio information (or a combination of information), or a graphical-type user interface (UI) (or GUI).

The computer 802 can serve in a role as a client, network component, a server, a database or other persistency, or any other component (or a combination of roles) of a computer system for performing the subject matter described in the instant disclosure. The illustrated computer 802 is communicably coupled with a network 830. In some implementations, one or more components of the computer 802 may be configured to operate within environments, including cloud-computing-based, local, global, or other environment (or a combination of environments).

At a high level, the computer 802 is an electronic computing device operable to receive, transmit, process, store, or manage data and information associated with the described subject matter. According to some implementations, the computer 802 may also include or be communicably coupled with an application server, email server, web server, caching server, streaming data server, or other server (or a combination of servers).

The computer 802 can receive requests over network 830 from a client application (for example, executing on another computer 802) and respond to the received requests by processing the received requests using an appropriate software application(s). In addition, requests may also be sent to the computer 802 from internal users (for example, from a command console or by other appropriate access method), external or third-parties, other automated applications, as well as any other appropriate entities, individuals, systems, or computers.

Each of the components of the computer 802 can communicate using a system bus 803. In some implementations, any or all of the components of the computer 802, hardware or software (or a combination of both hardware and software), may interface with each other or the interface 804 (or a combination of both), over the system bus 803 using an application programming interface (API) 812 or a service layer 813 (or a combination of the API 812 and service layer 813). The API 812 may include specifications for routines, data structures, and object classes. The API 812 may be either computer-language independent or dependent and refer to a complete interface, a single function, or even a set of APIs. The service layer 813 provides software services to the computer 802 or other components (whether or not illustrated) that are communicably coupled to the computer 802. The functionality of the computer 802 may be accessible for all service consumers using this service layer. Software services, such as those provided by the service layer 813, provide reusable, defined functionalities through a defined interface. For example, the interface may be software written in JAVA, C++, or other suitable language providing data in extensible markup language (XML) format or other suitable format. While illustrated as an integrated component of the computer 802, alternative implementations may illustrate the API 812 or the service layer 813 as stand-alone components in relation to other components of the computer 802 or other components (whether or not illustrated) that are communicably coupled to the computer 802. Moreover, any or all parts of the API 812 or the service layer 813 may be implemented as child or sub-modules of another software module, enterprise application, or hardware module without departing from the scope of this disclosure.

The computer 802 includes an interface 804. Although illustrated as a single interface 804 in FIG. 8, two or more interfaces 804 may be used according to particular needs, desires, or particular implementations of the computer 802. The interface 804 is used by the computer 802 for communicating with other systems that are connected to the network 830 (whether illustrated or not) in a distributed environment. Generally, the interface 804 comprises logic encoded in software or hardware (or a combination of software and hardware) and is operable to communicate with the network 830. More specifically, the interface 804 may comprise software supporting one or more communication protocols associated with communications such that the network 830 or interface's hardware is operable to communicate physical signals within and outside of the illustrated computer 802.

The computer 802 includes a processor 805. Although illustrated as a single processor 805 in FIG. 8, two or more processors may be used according to particular needs, desires, or particular implementations of the computer 802. Generally, the processor 805 executes instructions and manipulates data to perform the operations of the computer 802 and any algorithms, methods, functions, processes, flows, and procedures as described in the instant disclosure.

The computer 802 also includes a database 806 that can hold data for the computer 802 or other components (or a combination of both) that can be connected to the network 830 (whether illustrated or not). For example, database 806 can be an in-memory, conventional, or other type of database storing data consistent with this disclosure. In some implementations, database 806 can be a combination of two or more different database types (for example, a hybrid in-memory and conventional database) according to particular needs, desires, or particular implementations of the computer 802 and the described functionality. Although illustrated as a single database 806 in FIG. 8, two or more databases (of the same or combination of types) can be used according to particular needs, desires, or particular implementations of the computer 802 and the described functionality. While database 806 is illustrated as an integral component of the computer 802, in alternative implementations, database 806 can be external to the computer 802.

The computer 802 also includes a memory 807 that can hold data for the computer 802 or other components (or a combination of both) that can be connected to the network 830 (whether illustrated or not). Memory 807 can store any data consistent with this disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 (of the same or combination of types) can be used according to particular needs, desires, or particular implementations of the computer 802 and the described functionality. While memory 807 is illustrated as an integral component of the computer 802, in alternative implementations, memory 807 can be external to the computer 802.

The application 808 is an algorithmic software engine providing functionality according to particular needs, desires, or particular implementations of the computer 802, particularly with respect to functionality described in this disclosure. For example, application 808 can serve as one or more components, modules, or applications. Further, although illustrated as a single application 808, the application 808 may be implemented as multiple applications 808 on the computer 802. In addition, although illustrated as integral to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion or management circuits (including recharging, standby, or other power management functionality). In some implementations, the power-supply 814 can include a power plug to allow the computer 802 to be plugged into a wall socket or other power source to, for example, power the computer 802 or recharge a rechargeable battery.

There may be any number of computers 802 associated with, or external to, a computer system containing computer 802, each computer 802 communicating over network 830. Further, the term "client," "user," and other appropriate terminology may be used interchangeably, as appropriate, without departing from the scope of this disclosure. Moreover, this disclosure contemplates that many users may use one computer 802, or that one user may use multiple computers 802.

Described implementations of the subject matter can include one or more features, alone or in combination.

For example, in a first implementation, a computer-implemented method, comprising: receiving, by a programmable logic controller (PLC) from a first set of cameras that are positioned adjacent to a coiled tubing reel configured to deliver a coiled tubing string for insertion into a well, first information including images of the coiled tubing string captured over time during the insertion; receiving, by the PLC from a second different set of cameras that are positioned on a center of an arc of a primary turn imposed on the coiled tubing string, second information including images of the coiled tubing string captured over time during the insertion; receiving, by the PLC from a third different set of cameras that are positioned above a stripper and below an injector head, third information including images of the coiled tubing string captured over time during the insertion; receiving, by the PLC from a fourth different set of cameras that are embedded in an adapted spool below coiled tubing blow-out preventer equipment, fourth information including images of the coiled tubing string captured over time during the insertion; determining, by the PLC and using the first information, the second information, the third information, and the fourth information, that at least one flaw exists in a segment of the coiled tubing string; and providing a notification that includes information identifying the at least one flaw.

The foregoing and other described implementations can each, optionally, include one or more of the following features:

A first feature, combinable with any of the following features, wherein determining that at least one flaw exists in a segment of the coiled tubing string includes identifying portions of the coiled tubing string that include at least one of pitting or discoloration.

A second feature, combinable with any of the previous or following features, the method further comprising providing, by the PLC, power to the first set of cameras, the second different set of cameras, the third different set of cameras, and the fourth different set of cameras.

A third feature, combinable with any of the previous or following features, wherein providing the notification includes providing at least one of a text message, a phone call, a notification displayed in an application, or a notification displayed on a web page.

A fourth feature, combinable with any of the previous or following features, the method further comprising: determining that a numerical measure of the flaw in the segment of the coiled tubing string exceeds a pre-determined threshold; and stopping the insertion of the coiled tubing string into the well based on the determination.

A fifth feature, combinable with any of the previous or following features, wherein the first, second, third, and fourth information include depth information for the coiled tubing reel and date and time corresponding to a particular detected flaw.

A sixth feature, combinable with any of the previous or following features, wherein the well is an oil well or a gas well.

In a second implementation, a non-transitory, computer-readable medium storing one or more instructions executable by a computer system to perform operations comprising: receiving, by a PLC from a first set of cameras that are positioned adjacent to a coiled tubing reel configured to deliver a coiled tubing string for insertion into a well, first information including images of the coiled tubing string captured over time during the insertion; receiving, by the PLC from a second different set of cameras that are positioned on a center of an arc of a primary turn imposed on the coiled tubing string, second information including images of the coiled tubing string captured over time during the insertion; receiving, by the PLC from a third different set of cameras that are positioned above a stripper and below an injector head, third information including images of the coiled tubing string captured over time during the insertion; receiving, by the PLC from a fourth different set of cameras that are embedded in an adapted spool below coiled tubing blow-out preventer equipment, fourth information including images of the coiled tubing string captured over time during the insertion; determining, by the PLC and using the first information, the second information, the third information, and the fourth information, that at least one flaw exists in a segment of the coiled tubing string; and providing a notification that includes information identifying the at least one flaw.

The foregoing and other described implementations can each, optionally, include one or more of the following features:

A first feature, combinable with any of the following features, wherein determining that at least one flaw exists in a segment of the coiled tubing string includes identifying portions of the coiled tubing string that include at least one of pitting or discoloration.

A second feature, combinable with any of the previous or following features, the operations further comprising providing, by the PLC, power to the first set of cameras, the second different set of cameras, the third different set of cameras, and the fourth different set of cameras.

A third feature, combinable with any of the previous or following features, wherein providing the notification includes providing at least one of a text message, a phone call, a notification displayed in an application, or a notification displayed on a web page.

A fourth feature, combinable with any of the previous or following features, the operations further comprising: determining that a numerical measure of the flaw in the segment of the coiled tubing string exceeds a pre-determined threshold; and stopping the insertion of the coiled tubing string into the well based on the determination.

A fifth feature, combinable with any of the previous or following features, wherein the first, second, third, and fourth information include depth information for the coiled tubing reel and date and time corresponding to a particular detected flaw.

A sixth feature, combinable with any of the previous or following features, wherein the well is an oil well or a gas well.

In a third implementation, a computer-implemented system, comprising: one or more processors; and a non-transitory computer-readable storage medium coupled to the one or more processors and storing programming instructions for execution by the one or more processors, the programming instructions instruct the one or more processors to perform operations comprising: receiving, by a PLC from a first set of cameras that are positioned adjacent to a coiled tubing reel configured to deliver a coiled tubing string for insertion into a well, first information including images of the coiled tubing string captured over time during the insertion; receiving, by the PLC from a second different set of cameras that are positioned on a center of an arc of a primary turn imposed on the coiled tubing string, second information including images of the coiled tubing string captured over time during the insertion; receiving, by the PLC from a third different set of cameras that are positioned above a stripper and below an injector head, third information including images of the coiled tubing string captured over time during the insertion; receiving, by the PLC from a fourth different set of cameras that are embedded in an adapted spool below coiled tubing blow-out preventer equipment, fourth information including images of the coiled tubing string captured over time during the insertion; determining, by the PLC and using the first information, the second information, the third information, and the fourth information, that at least one flaw exists in a segment of the coiled tubing string; and providing a notification that includes information identifying the at least one flaw.

The foregoing and other described implementations can each, optionally, include one or more of the following features:

A first feature, combinable with any of the following features, wherein determining that at least one flaw exists in a segment of the coiled tubing string includes identifying portions of the coiled tubing string that include at least one of pitting or discoloration.

A second feature, combinable with any of the previous or following features, the operations further comprising providing, by the PLC, power to the first set of cameras, the second different set of cameras, the third different set of cameras, and the fourth different set of cameras.

A third feature, combinable with any of the previous or following features, wherein providing the notification includes providing at least one of a text message, a phone call, a notification displayed in an application, or a notification displayed on a web page.

A fourth feature, combinable with any of the previous or following features, the operations further comprising: determining that a numerical measure of the flaw in the segment of the coiled tubing string exceeds a pre-determined threshold; and stopping the insertion of the coiled tubing string into the well based on the determination.

A fifth feature, combinable with any of the previous or following features, wherein the first, second, third, and fourth information include depth information for the coiled tubing reel and date and time corresponding to a particular detected flaw.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a web browser through which a user can interact with some implementations of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

Cluster file system involved in this invention can be any file system type accessible from multiple servers for read and update. Locking or consistency tracking is not necessary in this invention since the locking of exchange file system can be done at application layer. Furthermore, Unicode data files are different from non-Unicode data files.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
receiving, by a programmable logic controller (PLC) from a first set of cameras that are positioned adjacent to a coiled tubing reel configured to deliver a coiled tubing string for insertion into a well, first information including images of the coiled tubing string captured over time during the insertion, wherein the images include images capturing the coiled tubing string leaving the coiled tubing reel;
receiving, by the PLC from a second different set of cameras that are positioned on a center of an arc of a primary turn imposed on the coiled tubing string, second information including images of the coiled tubing string captured over time during the insertion, wherein the images include images capturing the coiled tubing string passing by the center of the arc of the primary turn imposed on the coiled tubing string;
receiving, by the PLC from a third different set of cameras that are positioned above a stripper and below an injector head, third information including images of the coiled tubing string captured over time during the insertion, wherein the images include images capturing the coiled tubing string entering the stripper below the injector head;
receiving, by the PLC from a fourth different set of cameras that are embedded in an adapted spool below coiled tubing blow-out preventer equipment, fourth information including images of the coiled tubing string captured over time during the insertion, wherein the images include images capturing the coiled tubing string in the adapted spool below the coiled tubing blow-out preventer equipment, and wherein the first, second, third, and fourth information include video correlating depth information for the coiled tubing reel with date and time information corresponding to a particular detected flaw;

determining, by the PLC and using the first information, the second information, the third information, and the fourth information, that at least one flaw exists in a segment of the coiled tubing string, the determining including:
    correlating, using timestamps associated with the images, images captured at correlated positions on the coiled tubing string;
    analyzing and comparing, based on the correlating, the images from the first information, the second information, the third information, and the fourth information; and
    monitoring, based on the analyzing and comparing, depreciation of the coiled tubing string compared with original conditions of the coiled tubing string to determine that the at least one flaw exists; and
providing a notification that includes information identifying the at least one flaw.

2. The computer-implemented method of claim 1, further comprising:
    providing, by the PLC, power to the first set of cameras, the second different set of cameras, the third different set of cameras, and the fourth different set of cameras.

3. The computer-implemented method of claim 1, wherein determining that at least one flaw exists in a segment of the coiled tubing string includes identifying portions of the coiled tubing string that include at least one of pitting or discoloration.

4. The computer-implemented method of claim 1, wherein providing the notification includes providing at least one of a text message, a phone call, a notification displayed in an application, or a notification displayed on a web page.

5. The computer-implemented method of claim 1, further comprising:
    determining that a numerical measure of the flaw in the segment of the coiled tubing string exceeds a predetermined threshold; and
    stopping the insertion of the coiled tubing string into the well based on the determination.

6. The computer-implemented method of claim 1, wherein the well is an oil well or a gas well.

7. A non-transitory, computer-readable medium storing one or more instructions executable by a computer system to perform operations comprising:
    receiving, by a programmable logic controller (PLC) from a first set of cameras that are positioned adjacent to a coiled tubing reel configured to deliver a coiled tubing string for insertion into a well, first information including images of the coiled tubing string captured over time during the insertion, wherein the images include images capturing the coiled tubing string leaving the coiled tubing reel;
    receiving, by the PLC from a second different set of cameras that are positioned on a center of an arc of a primary turn imposed on the coiled tubing string, second information including images of the coiled tubing string captured over time during the insertion, wherein the images include images capturing the coiled tubing string passing by the center of the arc of the primary turn imposed on the coiled tubing string;
    receiving, by the PLC from a third different set of cameras that are positioned above a stripper and below an injector head, third information including images of the coiled tubing string captured over time during the insertion, wherein the images include images capturing the coiled tubing string entering the stripper below the injector head;
    receiving, by the PLC from a fourth different set of cameras that are embedded in an adapted spool below coiled tubing blow-out preventer equipment, fourth information including images of the coiled tubing string captured over time during the insertion, wherein the images include images capturing the coiled tubing string in the adapted spool below the coiled tubing blow-out preventer equipment, and wherein the first, second, third, and fourth information include video correlating depth information for the coiled tubing reel with date and time information corresponding to a particular detected flaw;
    determining, by the PLC and using the first information, the second information, the third information, and the fourth information, that at least one flaw exists in a segment of the coiled tubing string, the determining including:
        correlating, using timestamps associated with the images, images captured at correlated positions on the coiled tubing string;
        analyzing and comparing, based on the correlating, the images from the first information, the second information, the third information, and the fourth information; and
        monitoring, based on the analyzing and comparing, depreciation of the coiled tubing string compared with original conditions of the coiled tubing string to determine that the at least one flaw exists; and
    providing a notification that includes information identifying the at least one flaw.

8. The non-transitory, computer-readable medium of claim 7, the operations further comprising:
    providing, by the PLC, power to the first set of cameras, the second different set of cameras, the third different set of cameras, and the fourth different set of cameras.

9. The non-transitory, computer-readable medium of claim 7, wherein determining that at least one flaw exists in a segment of the coiled tubing string includes identifying portions of the coiled tubing string that include at least one of pitting or discoloration.

10. The non-transitory, computer-readable medium of claim 7, wherein providing the notification includes providing at least one of a text message, a phone call, a notification displayed in an application, or a notification displayed on a web page.

11. The non-transitory, computer-readable medium of claim 7, the operations further comprising:
    determining that a numerical measure of the flaw in the segment of the coiled tubing string exceeds a predetermined threshold; and
    stopping the insertion of the coiled tubing string into the well based on the determination.

12. The non-transitory, computer-readable medium of claim 7, wherein the well is an oil well or a gas well.

13. A computer-implemented system, comprising:
    one or more processors; and
    a non-transitory computer-readable storage medium coupled to the one or more processors and storing programming instructions for execution by the one or more processors, the programming instructions instruct the one or more processors to perform operations comprising:
        receiving, by a programmable logic controller (PLC) from a first set of cameras that are positioned adjacent to a coiled tubing reel configured to deliver a coiled tubing string for insertion into a well, first information including images of the coiled tubing string captured over time during the insertion, wherein the images include images capturing the coiled tubing string leaving the coiled tubing reel;

receiving, by the PLC from a second different set of cameras that are positioned on a center of an arc of a primary turn imposed on the coiled tubing string, second information including images of the coiled tubing string captured over time during the insertion, wherein the images include images capturing the coiled tubing string passing by the center of the arc of the primary turn imposed on the coiled tubing string;

receiving, by the PLC from a third different set of cameras that are positioned above a stripper and below an injector head, third information including images of the coiled tubing string captured over time during the insertion, wherein the images include images capturing the coiled tubing string entering the stripper below the injector head;

receiving, by the PLC from a fourth different set of cameras that are embedded in an adapted spool below coiled tubing blow-out preventer equipment, fourth information including images of the coiled tubing string captured over time during the insertion, wherein the images include images capturing the coiled tubing string in the adapted spool below the coiled tubing blow-out preventer equipment, and wherein the first, second, third, and fourth information include video correlating depth information for the coiled tubing reel with date and time information corresponding to a particular detected flaw;

determining, by the PLC and using the first information, the second information, the third information, and the fourth information, that at least one flaw exists in a segment of the coiled tubing string, the determining including:

correlating, using timestamps associated with the images, images captured at correlated positions on the coiled tubing string;

analyzing and comparing, based on the correlating, the images from the first information, the second information, the third information, and the fourth information; and monitoring, based on the analyzing and comparing, depreciation of the coiled tubing string compared with original conditions of the coiled tubing string to determine that the at least one flaw exists; and providing a notification that includes information identifying the at least one flaw.

14. The computer-implemented system of claim 13, the operations further comprising:

providing, by the PLC, power to the first set of cameras, the second different set of cameras, the third different set of cameras, and the fourth different set of cameras.

15. The computer-implemented system of claim 13, wherein determining that at least one flaw exists in a segment of the coiled tubing string includes identifying portions of the coiled tubing string that include at least one of pitting or discoloration.

16. The computer-implemented system of claim 13, wherein providing the notification includes providing at least one of a text message, a phone call, a notification displayed in an application, or a notification displayed on a web page.

17. The computer-implemented system of claim 13, the operations further comprising:

determining that a numerical measure of the flaw in the segment of the coiled tubing string exceeds a predetermined threshold; and stopping the insertion of the coiled tubing string into the well based on the determination.

* * * * *